United States Patent [19]

Leonard et al.

[11] 4,331,046
[45] May 25, 1982

[54] TRANSMISSION THROTTLE VALVE SYSTEM

[75] Inventors: Allan S. Leonard; Lawrence D. Burcz, both of Livonia, Mich.

[73] Assignee: Ford Motor Company, Dearborn, Mich.

[21] Appl. No.: 134,241

[22] Filed: Mar. 26, 1980

[51] Int. Cl.³ .................... B60K 41/06; B60K 41/10
[52] U.S. Cl. .................................. 74/867; 74/868; 74/869
[58] Field of Search ................ 74/867, 869, 868, 871

[56] References Cited

U.S. PATENT DOCUMENTS

| | | | |
|---|---|---|---|
| 2,733,732 | 2/1956 | Baker, Jr. | 74/867 X |
| 2,756,851 | 7/1956 | Collins | 74/867 X |
| 3,327,554 | 6/1967 | Searles | 74/869 |
| 3,543,610 | 12/1970 | Kogaki | 74/867 |
| 3,590,663 | 7/1971 | Yamaguchi et al. | 74/868 |
| 3,621,737 | 11/1971 | Uozumi | 74/868 |
| 3,650,160 | 3/1972 | Higuchi et al. | 74/868 X |
| 3,683,721 | 8/1972 | Uozumi et al. | 74/869 |
| 4,006,652 | 2/1977 | Murakami | 74/869 |
| 4,023,447 | 5/1977 | Sakai et al. | 74/869 |
| 4,033,201 | 7/1977 | Sakai | 74/869 |
| 4,033,203 | 7/1977 | Hirosawa et al. | 74/869 |
| 4,050,332 | 9/1977 | Taga | 74/869 |
| 4,134,313 | 1/1979 | Ishikawa | 74/867 |
| 4,145,937 | 3/1979 | Shindo | 74/867 |

FOREIGN PATENT DOCUMENTS 46-20769  6/1971  Japan ..................... 74/867

*Primary Examiner*—Leslie Braun
*Attorney, Agent, or Firm*—Donald J. Harrington; Keith L. Zerschling

[57] ABSTRACT

An automatic power transmission control system having a throttle valve adapted to be connected mechanically through a linkage to the adjustable engine carburetor throttle valve in an automotive vehicle driveline wherein provision is made, in the event of a failure of a mechanical linkage, for an increase in the effective throttle pressure signal made available to the control valve elements of the transmission system thereby assuring that the transmission clutches and brakes will have sufficient control pressure to maintain torque transmitting capacity for both torque delivery to the traction wheels as well as during engine braking of the vehicle at high speeds.

6 Claims, 6 Drawing Figures

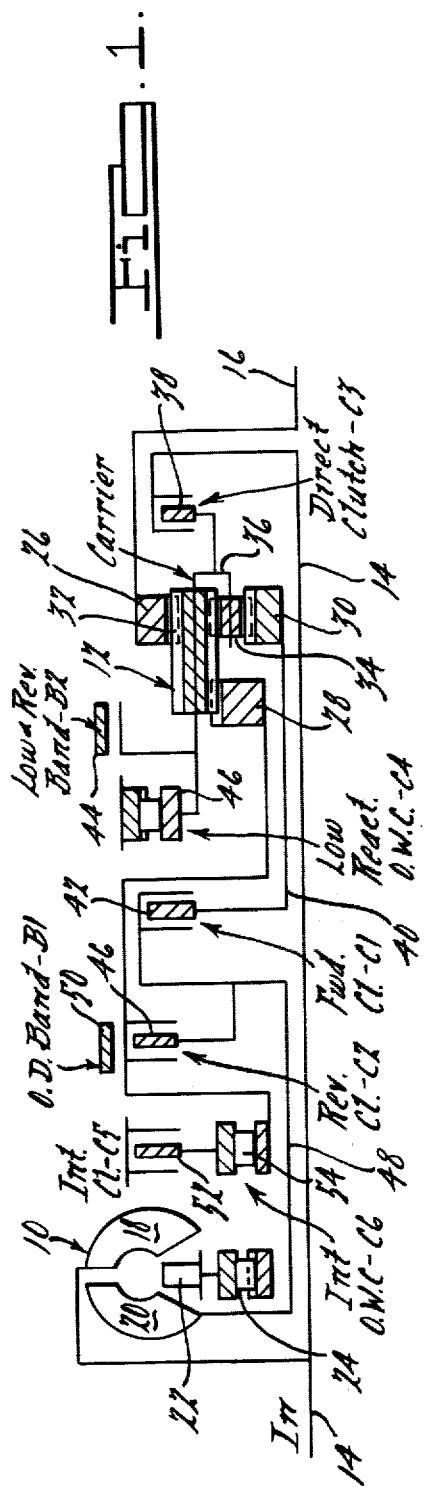

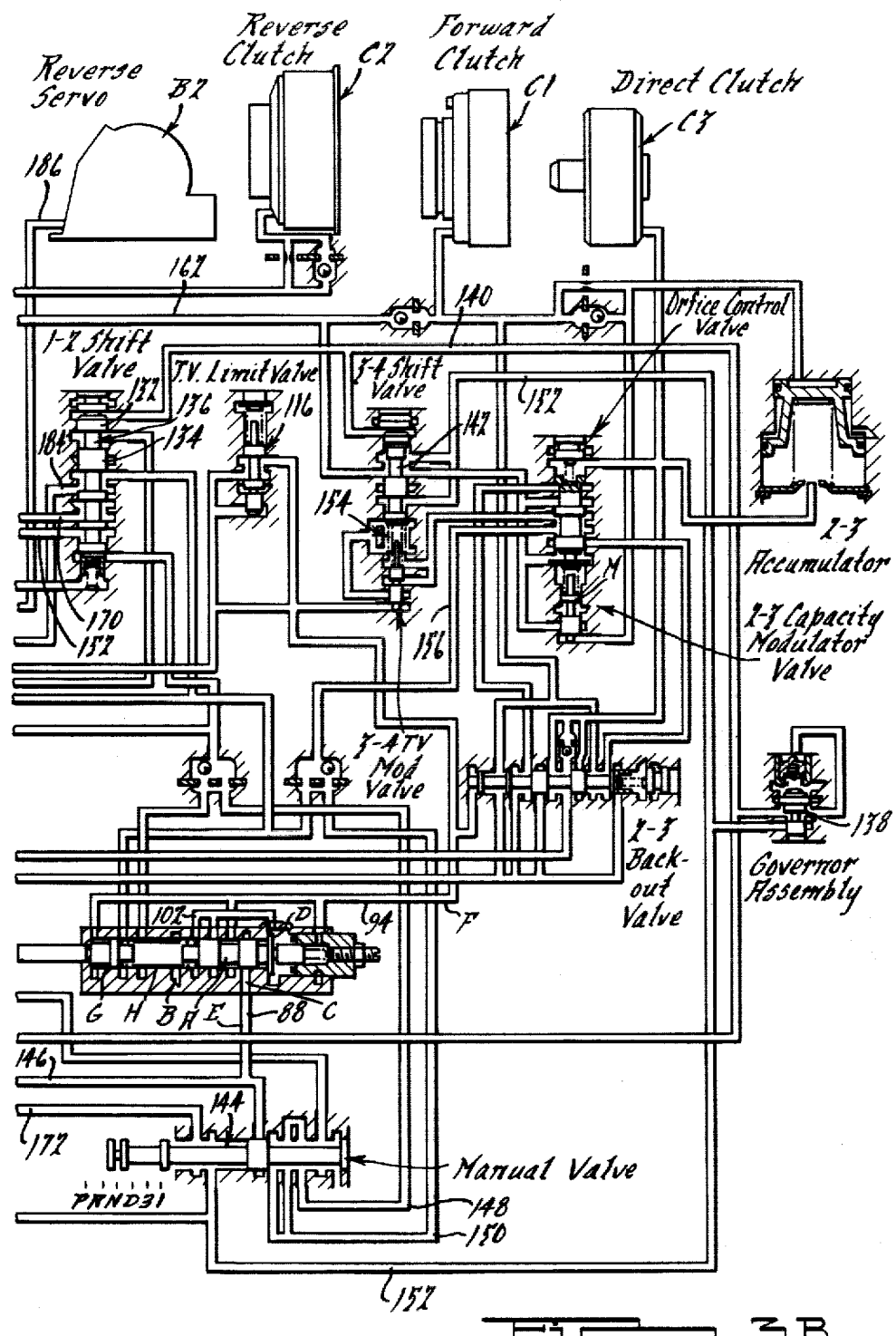

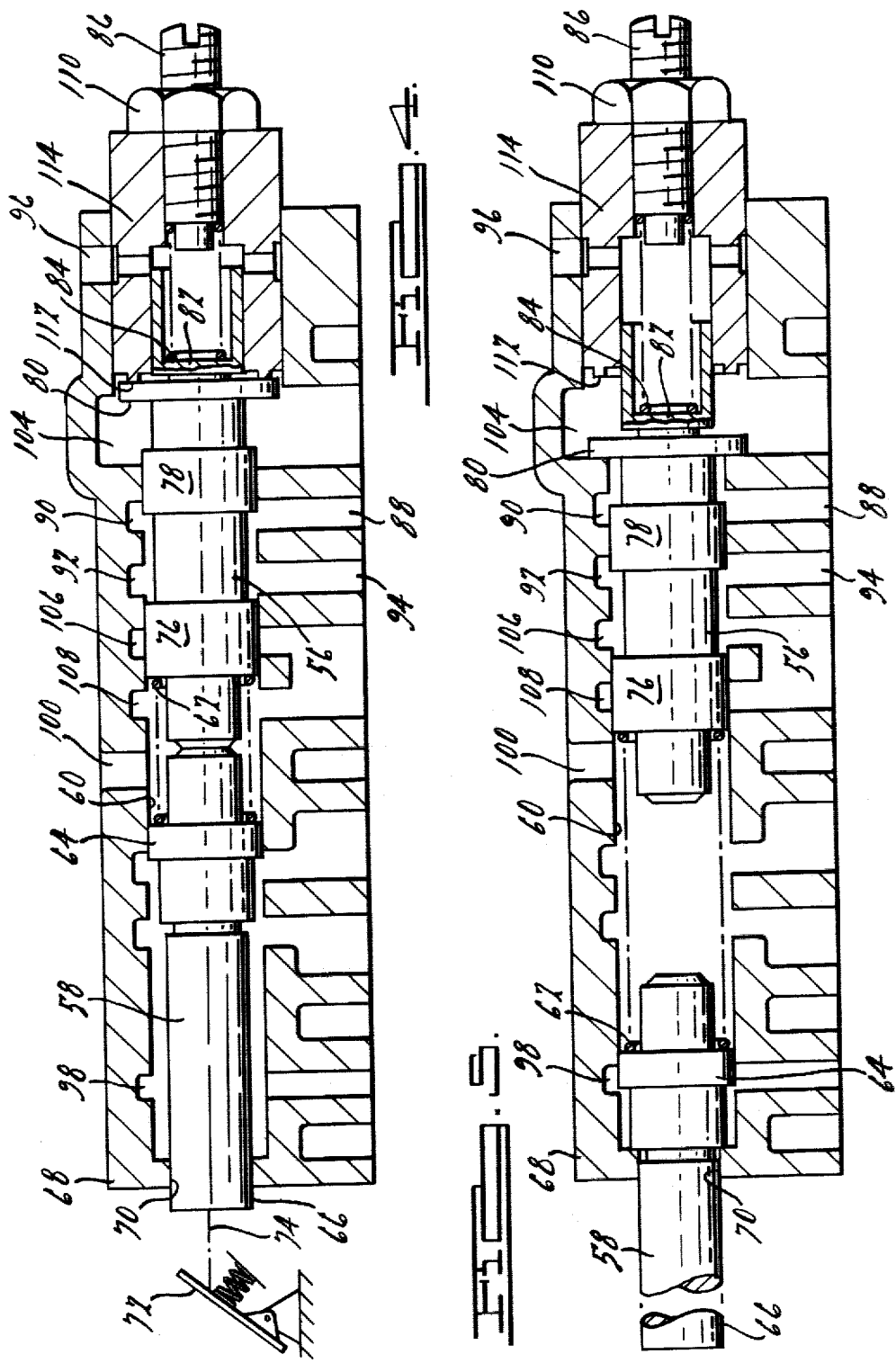

TRANSMISSION THROTTLE VALVE SYSTEM

GENERAL DESCRIPTION OF THE INVENTION

Our invention comprises improvements in the control system described in copending patent application Ser. No. 82,399, filed Oct. 5, 1979, by A. S. Leonard, R. C. Bolz and L. D. Burcz, entitled "Multiple Ratio Overdrive Transmission", which is assigned to the assignee of this invention. Reference may be made to that disclosure for purposes of supplementing this application.

The transmission of the copending Leonard et al application provides four forward driving ratios and a single reverse ratio, the highest forward driving ratio being an overdrive. The control system for the transmission includes friction clutches and brakes that are applied and released sequentially to establish the various driving ratios. The clutches and brakes are actuated by circuit pressure made available by a transmission driven pump. Pressure is distributed selectively to the clutches and brakes through automatic shift valves that respond to an engine load signal and a driven speed signal.

It is explained in the Leonard et al disclosure that the throttle valve system is capable of providing proper shift timing when the carburetor throttle valve is moved from an advanced setting to a coasting setting so that the effect of the resulting throttle pressure on the shift valves resembles the effect of throttle pressure produced in a control system that uses engine intake manifold pressure as a control variable for the transmission throttle valve. The throttle valve system of the copending application as well as that of the present disclosure has a position vs. pressure characteristic that generally will correspond to the characteristic that is inherent in a vacuum throttle valve system of earlier designs whereby a sharp change in the torque signal made available to the shift timing valves will be produced when the engine throttle is relaxed.

The present invention allows the output signal of the throttle valve to rise to a maximum value if for some reason the mechanical linkage between the carburetor throttle and the transmission throttle valve should fail. It comprises a modulator valve spool that receives control pressure from the transmission pump. A throttle valve plunger is aligned with the modulator valve and is separated from it by a control valve spring. When the plunger is moved upon failure of the linkage system to a relaxed position, the exhaust port for the throttle modulator valve becomes closed and the pressure distribution across the throttle valve is altered so that line pressure is made available to one end of the modulator valve element to shift the modulator valve element to a maximum output pressure position.

The signal thus made available to the control system is received by the regulator valve which results in an increase in the regulated pressure of the system. Maximum pressure then is made available to the friction clutch-and-brake elements because of the resulting increase in the regulated line pressure. Reference may be made to U.S. Pat. No. 3,327,554 (Searles) for an example of the manner in which the regulator valve in an automatic power transmission mechanism responds to changing throttle pressure to produce a boost in the line pressure made available to the friction elements. An increase in the magnitude of the throttle pressure in the Searles control system, like an increase in the magnitude of the throttle pressure in the present system, will result in a force on the regulator valve element that supplements the valve spring force acting thereon to produce a higher regulated pressure level.

BRIEF DESCRIPTION OF THE FIGURES OF THE DRAWINGS

FIG. 1 shows in schematic form a hydrokinetic torque converter and gear arrangement that may be controlled by a control system of this invention.

FIG. 2 is a chart that shows the clutch-and-brake engagement and release pattern for the transmission system of FIG. 1.

FIGS. 3A and 3B together show an automatic control valve circuit for accomplishing the engagement and release of the clutches and brakes for the transmission system of FIG. 1.

FIG. 4 is an enlargement of the throttle valve mechanism shown in FIG. 3B.

FIG. 5 is a view similar to FIG. 4 but it shows the valve elements of the throttle valve mechanism in the position that it would assume if the linkage connection with the carburetor throttle were to be disabled.

PARTICULAR DESCRIPTION OF THE INVENTION

Figure 3A:
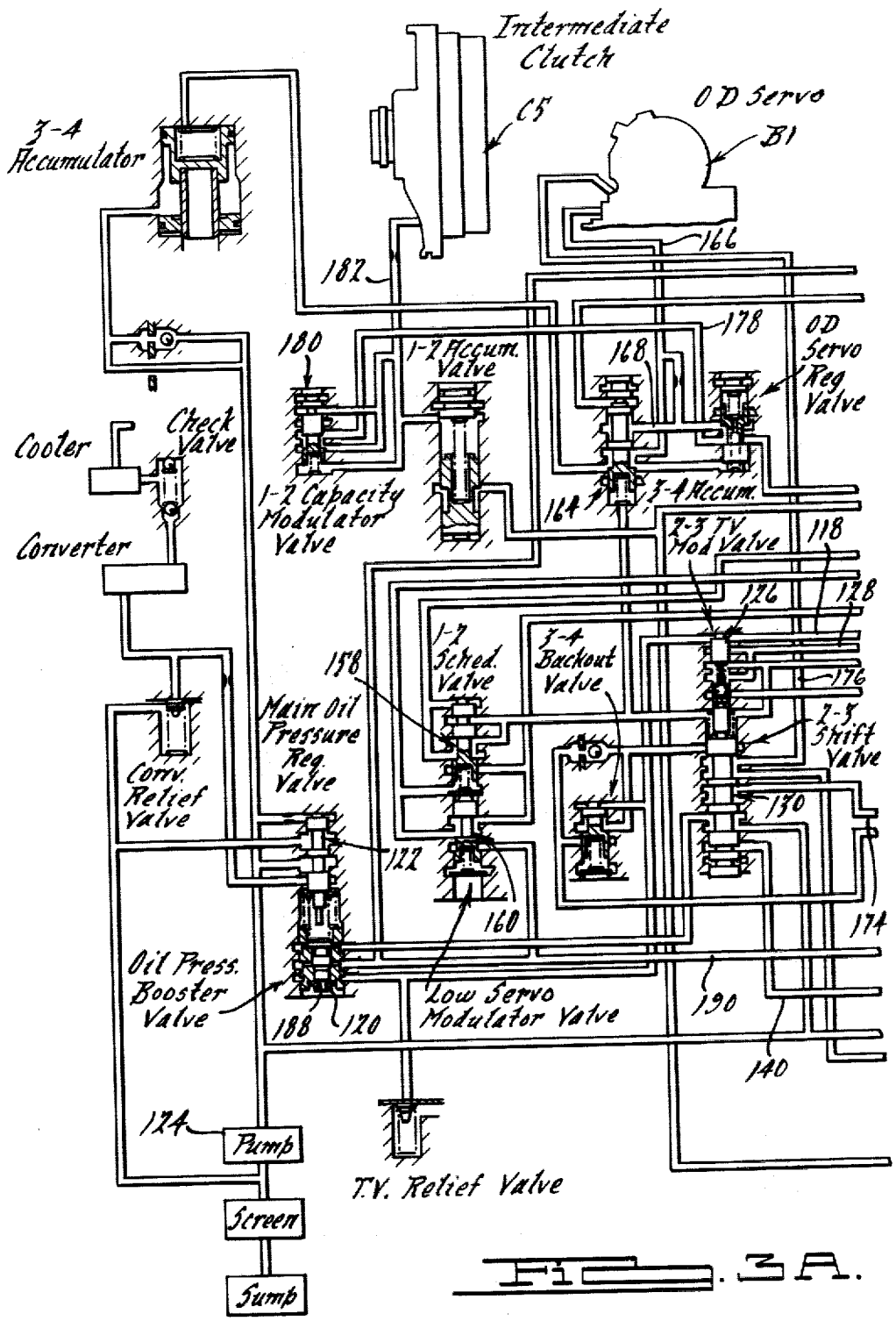

In FIG. 1 the hydrokinetic torque converter is designated by reference numeral 10 and a compound planetary gear unit is generally designated by reference character 12. The converter and the gear unit establish a driving connection between the torque input shaft 14 and a transmission torque output shaft 16, the former being connected to a vehicle engine crankshaft and the latter being connected through a differential mechanism and driveshaft to the vehicle traction wheels.

Converter 10 comprises a bladed impeller 18, a bladed turbine 20 and a bladed stator 22. The impeller, the turbine and the stator are arranged in a torus circuit in fluid flow relationship. Stator 22 is mounted on a one way brake 24 which includes a fixed inner race, a cammed outer race connected to the blades of the stator and overrunning brake rollers located between the races whereby the stator is permitted to rotate in the direction of rotation of the impeller but rotation in the opposite direction is prevented.

The gear unit 12 includes a ring gear 26 that is connected to the driven shaft 16, a large sun gear 28, a small sun gear 30, long planet pinions 32 and short planet pinions 34. The pinions 32 and 34 engage each other, and they are rotatably mounted on a common carrier 36. Pinions 34 engage small sun gear 30 and pinions 32 engage ring gear 26 and large sun gear 28. The input shaft 14 extends through the center of the converter and the gearing and is adapted to be connected selectively to the carrier 36 by means of direct clutch 38 during third speed ratio operation and fourth speed ratio overdrive operation.

Sun gear 30 is connected to turbine 20 by means of sleeve shaft 40 and selectively engagable clutch 42 which is applied during operation in the first three underdrive speed ratios. Brake band 44 surrounds a brake drum that forms a part of the carrier 36. It is applied during operation in the reverse drive ratio as well as in the lowest forward drive ratio when hill braking is desired. Overrunning coupling 46 is in parallel relationship with respect to the brake band 44 and is adapted to anchor the carrier 36 during low speed ratio forward drive operation when coasting or hill braking is not needed.

Friction clutch 46 is applied during reverse drive operation to connect the large sun gear 28 to turbine shaft 48 which is driven by the turbine 20. An overdrive brake band 50 surrounds a brake drum that is common to the brake 46 and which is connected to the sun gear 28. Brake band 50 is applied during operation in the fourth overdrive ratio.

Friction brake 52 and overrunning coupling 54 are arranged in series relationship and are adapted to anchor the sun gear 28 during operation in the second forward driving ratio. Both clutches 38 and 42 are applied during operation in the third or direct drive ratio and the overrunning brake 54 freewheels to permit a nonsynchronous shift to occur.

A shift from the direct drive ratio to the overdrive ratio is achieved merely by engaging the brake band 50 and releasing the clutch 42. Torque is delivered through the clutch 38 to the carrier and with the sun gear acting as a reaction point the ring gear 26 is overdriven.

In FIG. 2 I have shown a clutch-and-brake engagement and release pattern for the clutches and brakes shown in FIG. 1. The brakes have been identified by reference characters $B_1$, $B_2$ and $C_5$ and the clutches are identified by reference characters $C_1$, $C_2$, $C_3$, $C_4$ and $C_6$ in both FIGS. 2 and 1.

FIGS. 3A and 3B show in schematic form a valve circuit for controlling the application and release of the clutch-and-brake operating servos in the transmission system of FIG. 1. As mentioned earlier in this description, the control valve circuit includes a throttle valve that used to establish an engine torque demand signal. The throttle valve comprises a modulator valve element 56 and a throttle valve plunger 58 which are located in a common throttle valve bore 60. The plunger 58 is separated from the valve element 56 by a compression spring 62. The plunger 58 has a valve land 64 and an extension 66 that extends outside the throttle valve body 68. The plunger extension 66 is slidably received in an internal land 70. It is connected mechanically to engine carburetor accelerator pedal 72 by means of the mechanical linkage schematically shown at 74.

The valve element 56 comprises a pair of spaced valve lands 76 and 78 and an annular stop 80 which slidably engages a plunger 82 located in the right hand end of the throttle valve bore 60. Plunger 82 is urged in a left hand direction by spring 84 which is seated at its right hand end on a throttle valve adjustment screw 86 threadably received in the right hand end of the valve body 68. The spring 84 and the spring 62 establish opposed spring forces on the valve element 56, the net spring force being in a right hand direction. Regulated pump pressure in passage 88 is distributed to a port 90 in a valve bore 60. Valve land 78 registers with the port 90.

Port 92, which is located between lands 76 and 78, communicates with throttle pressure passage 94. That same passage 94 communicates also with port 96 which distributes throttle pressure to the pressure chamber located on the right hand side of the plunger 82. Passage 94 also communicates with port 98 at the left hand side of the bore 60, the port 98 distributing throttle pressure to the valve cavity located on the left hand side of the valve land 64. That throttle pressure establishes a pressure feedback force on the plunger 66 which assists the force applied to the plunger by the mechanical linkage 74 thereby reducing the pedal effort required by the operator to move the accelerator pedal 72.

The portion of the valve bore 60 located between the plunger 58 and the valve element 56 is vented through an exhaust port 100.

An exhaust crossover passage 102 communicates with the right hand side of the valve element 56 through valve port 104. Passage 102 communicates also with valve port 106 which registers with the valve land 76. It communicates with the exhausted space on the left hand side of the valve element 56 through valve port 108 which registers with valve land 76 under certain conditions that will be described subsequently.

The regulated throttle pressure level for any give throttle position can be adjusted by turning adjustment screw 86 either one way or the other and then locking it with respect to the valve housing by lock nut 110. The adjustment screw 86 extends outwardly from the valve body to make it readily accessible with a suitable hand tool.

FIG. 4 shows the throttle valve in a wide open throttle position. The annular stop 80 engages a shoulder 112 on sleeve 114 within which the plunger 82 is situated. FIG. 5 shows the same valve elements illustrated in FIG. 4 when the valve elements assume a position corresponding to an inoperative throttle valve linkage. Note that the plunger 58 is fully retracted in the position of FIG. 5. The exhaust port 108 is blocked by land 76 when the plunger 58 assumes the position of FIG. 5 thereby permitting direct communication between line pressure passage 88 and port 90, the latter communicating with port 92, which is in direct communication with throttle pressure outlet passage 94 as explained previously. Thus, in the position of FIG. 5. Passage 94 is supplied with maximum regulated line pressure from the pressure regulator valve.

Throttle pressure from passage 94 is distributed through a TV limit valve 116 to passage 118 which extends directly to a main regulator valve booster 120. The regulator valve, which is generally designated by reference 122 is aligned with the booster 120 and functions to regulate the magnitude of the pressure on the outlet side of the engine driven transmission pump 124. The TV limit valve 116 will function as explained in the copending Leonard et al application mentioned previously to establish an upper limit on the magnitude of the throttle pressure made available to the shift valves and to the regulator valve.

The 2-3 modulator valve shown at 126 establishes a modulated TV pressure in passage 128 which extends to the top of the 2-3 shift valve 130 and to the differential area defined by lands 132 and 134 on the 1-2 shift valve 136.

A speed signal is obtained from governor valve 138. That speed signal is distributed to each of the shift valves through governor passage 140. Governor pressure is caused to act on the upper side of the 3-4 shift valve 142, the 1-2 shift valve 136 and the bottom of the 2-3 shift valve 130. The shift valves thus respond to the opposed forces of the governor and the modulated TV pressure to produce the various automatic upshifts and downshifts as explained in the copending Leonard et al application.

The manual valve 144 receives regulated pressure from the pump 124 through passage 146 depending upon the position assumed by the manual valve. The manual valve will distribute pressure to passage 148 during operation in reverse and manual low operation, to passage 150 during operation in drive range D manual low and reverse and to passage 152 during operation in overdrive, direct drive and manual low.

The 3-4 shift valve controls automatic 3-4 upshifts and 4-3 downshifts in response to changing governor and throttle pressures. The 3-4 throttle valve modulator 154 modulates the throttle valve pressure acting on the 3-4 shift valve. It receives its pressure from passage 94. When passage 156 is pressurized during operation in direct manual low and reverse throttle ranges, the lower end of the 2-3 shift valve is pressurized to render it inactive.

The 2-1 scheduling valve 158, which communicates with passage 148, determines the 2-1 downshift speed when the manual valve is moved to the manual low position from direct or overdrive range. The low servo modulator valve 160 regulates the low-and-reverse servo apply pressure to achieve a smooth 2-1 downshift upon application of the low servo $B_2$ in the manual low drive range. The pressure for the manual valve is supplied to the 2-1 scheduling valve through passage 148 and through the 1-2 shift valve when the latter is in the upward position.

Passage 152 delivers pressure from the manual valve to the 3-4 shift valve during operation in the overdrive range, the direct drive range and the manual low range. When the 3-4 shift valve is moved in a downward direction by reason of the signal pressure forces acting on it, control pressure in passage 152 is distributed through passage 162 to the 3-4 shuttle valve 164 causing it to move in a downward direction thereby establishing a fluid connection between passage 166 to the apply side of the overdrive brake servo $B_1$ and passage 168, the latter being pressurized when the 1-2 shift valve moves in a downward direction as communication is established between passages 170 and 152.

Passage 172 is pressurized when the manual valve moves to the overdrive position or the direct drive position. The 2-3 shift valve 130 establishes communication between passage 172 and passage 174 when it is moved in an upward direction, passage 174 extending to the direction drive clutch $C_3$. Passage 176, which extends to the release side of the overdrive brake servo, is pressurized when the 2-3 shift valve assumes the downward position illustrated in the drawings.

Passages 152 and 170 are brought into communication when the 1-2 shift valve is moved in a downward direction. This pressurizes passage 178 which extends through the 1-2 capacity modulator 180 to the feed passage 182 for the intermediate clutch. Passage 148 supplies pressure to the 1-2 shift valve and is brought into communication with passage 184. When it is moved to the upward position, passage 184 extends through the 2-1 scheduling valve to low-and-reverse feed passage 186 thereby applying the servo $B_2$.

Regardless of which friction element is engaged, sufficient pressure will be applied to the servo that operates the friction element upon a failure of the linkage system illustrated schematically in the drawings at 72 and 74. This is because of the fact that the throttle pressure in passage 94 is replaced with line pressure as previously explained as port 108 becomes sealed by land 76 on the throttle valve element 102. Passage 94 extends through the TV limit valve 116 and through passage 118 to the lower end of the main booster regulator as shown at 188, passage 190 providing communication between the TV limit valve and the main regulator booster. This force supplements the spring force acting the regulator valve spool thereby producing a higher regulated pressure in the passage 146 which supplies the manual valve 144.

Having thus described a preferred embodiment of our invention, what we claim and desire to secure by U.S. Letters Patent is:

1. In a torque delivery driveline for a vehicle having a driver operated engine throttle and a multiple ratio transmission, an automatic transmission control system for controlling application and release of fluid pressure operated clutch and brake servos in said transmission including a pump, control pressure passages connecting the pump to the servos, a pressure regulator valve means for regulating the pressure made available to said servos and shift valves in said passages adapted to establish and interrupt transfer of control pressure to said servos; the improvement comprising a transmission throttle valve means for establishing a signal pressure that is proportional in magnitude to the torque at the input side of said transmission comprising:

a modulator valve element and a throttle plunger element mounted in a valve chamber, a valve spring between said plunger and said throttle valve element, means for applying a force on said valve element that opposes the force of said spring, a throttle pressure output port, a regulated pressure input port and an exhaust port communicating with said valve chamber and registering with said valve element whereby a modulating action is established to produce said signal pressure in said output port; said passages including a first passage portion communicating with said output port, a second portion communicating with said shift valve and a third portion communicating with said regulator valve means; said regulator valve means responding to changes in the magnitude of said signal pressure to increase or decrease the regulated pressure in said servos; a driving connection between said engine throttle and said plunger; said valve element being shifted by the valve forces acting thereon to block said exhaust port when said driving connection is disabled whereby the pressure in said output port rises to the regulated pressure in said input port.

2. The improvement set forth in claim 1 wherein said exhaust port comprises a portion communicating with said valve chamber between said plunger and said valve element, and a portion registering with said valve element, said portions being connected together.

3. The improvement set forth in claim 1 wherein said force applying means comprises a second plunger element mounted for shifting movement in said valve chamber and a second valve spring acting on said second plunger element to produce a valve element actuating force that opposes the force of said first mentioned valve spring.

4. The improvement set forth in claim 2 wherein said force applying means comprises a second plunger element mounted for shifting movement in said valve chamber and a second valve spring acting on said second plunger element to produce a valve element actuating force that opposes the force of said first mentioned valve spring.

5. The improvement set forth in claim 3 wherein said throttle valve means comprises a spring force adjusting means including an adjusting screw engageable with one end of said second valve spring whereby the signal pressure for any given movement of said first mentioned plunger element can be varied.

6. In a torque delivery driveline for a vehicle having a driver operated engine throttle, an automatic transmission control system for controlling application and release of fluid pressure operated clutch-and-brake servos in said transmission including a pump, control pressure passages connecting the pump to the servos, a pressure regulator valve means for regulating the pressure made available to said servos and shift valves in said passages adapted to establish and interrupt transfer of control pressure to said servos; the improvement comprising a transmission throttle valve means for establishing a signal pressure that is proportional in magnitude to the torque at the input side of said transmission comprising:

a modulator valve element and a throttle plunger element mounted in said valve chamber, a valve spring between said plunger and said throttle valve element, means for applying a form on said valve element that opposes the force of said spring, a throttle pressure output port, a regulated pressure input port, and an exhaust port communicating with said valve chamber and registering with said valve element whereby a modulating action is established to produce said signal pressure in said output port; said passages including a first passage communicating with said output port, a second portion communicating with said shift valve and a third portion communicating with said regulator valve means; said regulator valve means responding to changes in the magnitude of said signal pressure to increase or decrease the regulated pressure in said servos; a driving connection between said engine throttle and said plunger; adjusting means including an adjustable screw engageable with one end of said second valve spring whereby the signal pressure for any given movement of said first mentioned plunger element can be varied.

* * * * *